United States Patent
Bak

(10) Patent No.: US 8,394,533 B2
(45) Date of Patent: Mar. 12, 2013

(54) CYLINDRICAL SECONDARY BATTERY RESPONSIVE TO OPERATING PRESSURE FOR INTERRUPTING CURRENT

(75) Inventor: Hyo-Rim Bak, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 418 days.

(21) Appl. No.: 12/705,338

(22) Filed: Feb. 12, 2010

(65) Prior Publication Data

US 2010/0209765 A1    Aug. 19, 2010

(30) Foreign Application Priority Data

Feb. 16, 2009 (KR) .................. 10-2009-0012525

(51) Int. Cl.
| | |
|---|---|
| H01M 2/02 | (2006.01) |
| H01M 4/13 | (2010.01) |
| H01M 4/131 | (2010.01) |
| H01M 6/16 | (2006.01) |

(52) U.S. Cl. ............... 429/231.95; 429/221; 429/223; 429/224; 429/231.5; 429/231.8; 429/164; 429/324

(58) Field of Classification Search .......... 429/164, 429/174, 61, 231.95, 231.1, 7, 185, 221, 429/223, 224, 231.5, 231.8, 324

See application file for complete search history.

(56) References Cited

U.S. PATENT DOCUMENTS

| | | | |
|---|---|---|---|
| 5,462,820 A * | 10/1995 | Tanaka | ............ 429/174 |
| 5,962,167 A | 10/1999 | Nakai et al. | |
| 6,258,477 B1 | 7/2001 | Kashihara et al. | |
| 6,346,344 B1 * | 2/2002 | Song et al. | ............ 429/61 |
| 7,060,388 B2 | 6/2006 | Naruoka | |
| 2005/0227147 A1 * | 10/2005 | Kogetsu et al. | ........ 429/231.95 |
| 2006/0093914 A1 | 5/2006 | Tanaka et al. | |
| 2006/0194114 A1 | 8/2006 | Saito | |
| 2008/0182175 A1 | 7/2008 | Okazaki et al. | |
| 2008/0241647 A1 | 10/2008 | Fukui et al. | |

FOREIGN PATENT DOCUMENTS

| | | |
|---|---|---|
| CN | 1243606 A | 2/2000 |
| CN | 2845183 Y | 12/2006 |
| CN | 2881974 Y | 3/2007 |

(Continued)

OTHER PUBLICATIONS

Extended European Search report dated Jul. 5, 2010 for corresponding EP Application No. 10250262.2.

(Continued)

*Primary Examiner* — Basia Ridley
*Assistant Examiner* — Kenneth Douyette
(74) *Attorney, Agent, or Firm* — Knobbe Martens Olson & Bear LLP

(57) ABSTRACT

A cylindrical secondary battery including an electrode assembly including a positive electrode having a positive electrode active material layer containing lithium carbonate ($Li_2CO_3$), a negative electrode including a negative electrode active material layer, and a separator separating the positive electrode from the negative electrode, a can housing the electrode assembly, a cap assembly disposed on the can, and an electrolyte injected into the can. A content of the lithium carbonate ($Li_2CO_3$) is in the range of 1.0 to 1.5 wt % of the total weight of the positive electrode active material layer, a content of the electrolyte is in the range of 10.8 to 11.93 wt % of the total weight of a bare cell, and an operating pressure for interrupting current by the cap assembly is in the range of 7 to 9 kgf/cm$^2$.

20 Claims, 9 Drawing Sheets

FOREIGN PATENT DOCUMENTS

| | | |
|---|---|---|
| EP | 1347524 | 9/2003 |
| JP | 10-321258 A | 12/1998 |
| JP | 2001-167767 | 6/2001 |
| JP | 2003-142068 A | 5/2003 |
| JP | 2005-285572 | 10/2005 |
| JP | 2006-236886 A | 7/2006 |
| JP | 2007-200865 | 8/2007 |
| JP | 2008-243661 A | 10/2008 |
| KR | 1020010095309 | 11/2001 |
| KR | 1020070105724 | 10/2007 |
| KR | 10-2008-0071889 | 8/2008 |
| KR | 10 2008 0109949 | 12/2008 |

OTHER PUBLICATIONS

Office Action dated Mar. 2, 2012 for corresponding CN Application No. 201010117130.5.

Office Action dated Feb. 21, 2011 for corresponding Korean Patent Application No. 10-2009-0012525.

Japanese Office Action issued in corresponding Japanese Patent Application No. 2010-027874, dated Sep. 25, 2012, 2 pages.

\* cited by examiner

CYLINDRICAL SECONDARY BATTERY RESPONSIVE TO OPERATING PRESSURE FOR INTERRUPTING CURRENT

CROSS-REFERENCE TO RELATED APPLICATION

This application claims the benefit of Korean Patent Application No. 2009-0012525, filed Feb. 16, 2009, the disclosure of which is hereby incorporated herein by reference in its entirety.

BACKGROUND OF THE INVENTION

1. Field of the Invention

The present invention relates a cylindrical secondary battery, and more particularly, to a secondary battery capable of ensuring maximum battery stability without degrading battery performance.

2. Description of the Related Art

The rapid development of compact and lightweight portable electronic devices in recent times has created a growing need for compact and high-capacity batteries. In particular, use of lithium secondary batteries is rapidly increasing because they have a high energy density per unit weight and an operating voltage of 3.6 V or higher, which is 3 times higher than nickel-cadmium or nickel-metal hydride batteries that are widely used in portable electronic devices.

Lithium secondary batteries produce electric energy by redox reactions occurring when lithium ions are intercalated or deintercalated at positive and negative electrodes. Lithium secondary batteries use a material capable of reversibly intercalating or deintercalating lithium ions as active materials for positive and negative electrodes, and have an organic or polymer electrolyte between the positive electrode and the negative electrode.

Lithium secondary batteries include an electrode assembly wound in a jelly-roll shape, in which a separator is interposed between a negative electrode and a positive electrode. These batteries also include a can housing the electrode assembly and an electrolyte, and a cap assembly disposed over the can.

Lithium secondary batteries have the potential to explode or catch fire when subjected to overcharging or overcurrent, and thus they require a safety device to prevent overcharging of the batteries.

Generally, since lithium secondary batteries are fabricated by adding gasification materials such as biphenyl (BP) or cyclohexylbenzene (CHB) to the electrolyte, a large amount of gas is generated during overcharging of the battery, thus operating a current interrupting means. However, it is difficult to exactly control the amount of gas, and when too much gas is added, the lifespan of the battery may decrease and various side reactions may occur.

Meanwhile, as the cost of lithium cobalt dioxide (LiCoO$_2$) used as the positive electrode active material increases, a relatively low-cost, nickel-based positive electrode active material such as NCM or NCA is being looked to as an alternative.

However, the nickel-based positive electrode active material such as NCM or NCA does not generate a sufficient amount of gas during overcharging of the battery.

That is, when the battery is overcharged, generation of a certain amount of gas in the battery operates the current interrupting means to interrupt current and ensures stability of the battery. However, since the nickel-based positive electrode active material does not generate a sufficient amount of gas in the case of a conventional battery design, the current interrupting means may not operate soon enough to ensure battery stability.

SUMMARY OF THE INVENTION

Aspects of the present invention provide a cylindrical secondary battery capable of ensuring maximum battery stability without degrading the reliability of the battery.

Aspects of the present invention also provide a cylindrical secondary battery having excellent 90-degree storage and adiabatic overcharge characteristics, without lowering a capacity retention rate, by controlling lithium carbonate content, electrolyte content and operating pressure of the secondary battery.

According to an exemplary embodiment of the present invention, a cylindrical secondary battery includes: an electrode assembly including a positive electrode having a positive electrode active material layer containing lithium carbonate (Li$_2$CO$_3$), a negative electrode having a negative electrode active material layer, and a separator separating the positive electrode from the negative electrode; a can housing the electrode assembly; a cap assembly disposed on the can; and an electrolyte injected into the can. Here, a content of the lithium carbonate (Li$_2$CO$_3$) is in the range of 1.0 to 1.5 wt % of the total weight of the positive electrode active material layer, a content of the electrolyte is in the range of 10.8 to 11.93 wt % of the total weight of a bare cell, and an operating pressure for interrupting current by the cap assembly is in the range of 7 to 9 kgf/cm$^2$.

According to another exemplary embodiment of the present invention, a cylindrical secondary battery includes: an electrode assembly; a can housing the electrode assembly; a cap assembly disposed on the can; and an electrolyte injected into the can. Here, the electrode assembly includes lithium carbonate (Li$_2$CO$_3$) with a content ranging from 1.0 to 1.5 wt % of the total weight of a positive electrode active material layer, the electrolyte is injected with a content ranging from 10.8 to 11.93 wt % of the total weight of a bare cell, and an operating pressure for interrupting current by the cap assembly is in the range of 7 to 9 kgf/cm$^2$.

Here, the positive electrode active material layer may further include a nickel-based positive electrode active material.

The nickel-based positive electrode active material may include at least one selected from the group consisting of the materials represented by Formulae (1) to (7):

$$Li_xNi_{1-y}M_yA_2 \tag{1}$$

$$Li_xNi_{1-y}M_yO_{2-z}X_z \tag{2}$$

$$Li_xNi_{1-y}Co_yO_{2-z}X_z \tag{3}$$

$$Li_xNi_{1-y-z}Co_yM_zA_\alpha \tag{4}$$

$$Li_xNi_{1-y-z}Co_yM_zO_{2-\alpha}X_\alpha \tag{5}$$

$$Li_xNi_{1-y-z}Mn_yM_zA_\alpha \tag{6) and}$$

$$Li_xNi_{1-y-z}Mn_yM_zO_{2-\alpha}X_\alpha \tag{7}.$$

Here, $0.9 \leq x \leq 1.1$, $0 \leq y \leq 0.5$, $0 \leq z \leq 0.5$, $0 \leq \alpha \leq 2$, M is the same as or different from M' and selected from the group consisting of Mg, Al, Co, K, Na, Ca, Si, Ti, Sn, V, Ge, Ga, B, As, Zr, Mn, Cr, Fe, Sr, V and rare earth elements, A is selected from the group consisting of O, F, S and P, and X is selected from the group consisting of F, S and P.

The cap assembly may include a cap-up, a positive temperature coefficient (PTC) thermistor, a current interrupt device (CID) and a vent, sequentially disposed from top to bottom, and the operating pressure for interrupting current may refer to a pressure inside the battery when current inside the battery is interrupted by disconnection between a projecting portion of the vent and an electrode tab at a welded portion.

Alternatively, the cap assembly may include a cap-up, a PTC thermistor, a vent, a cap-down and a sub-plate, sequentially disposed from top to bottom, and the operating pressure for interrupting current may refer to a pressure inside the battery when current inside the battery is interrupted by disconnection between a projecting portion of the vent and the sub-plate at a welded portion, or breakage of a certain region of the sub-plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of exemplary embodiments, taken in conjunction with the accompanying drawings of which.

DETAILED DESCRIPTION OF THE INVENTION

Figure 1:
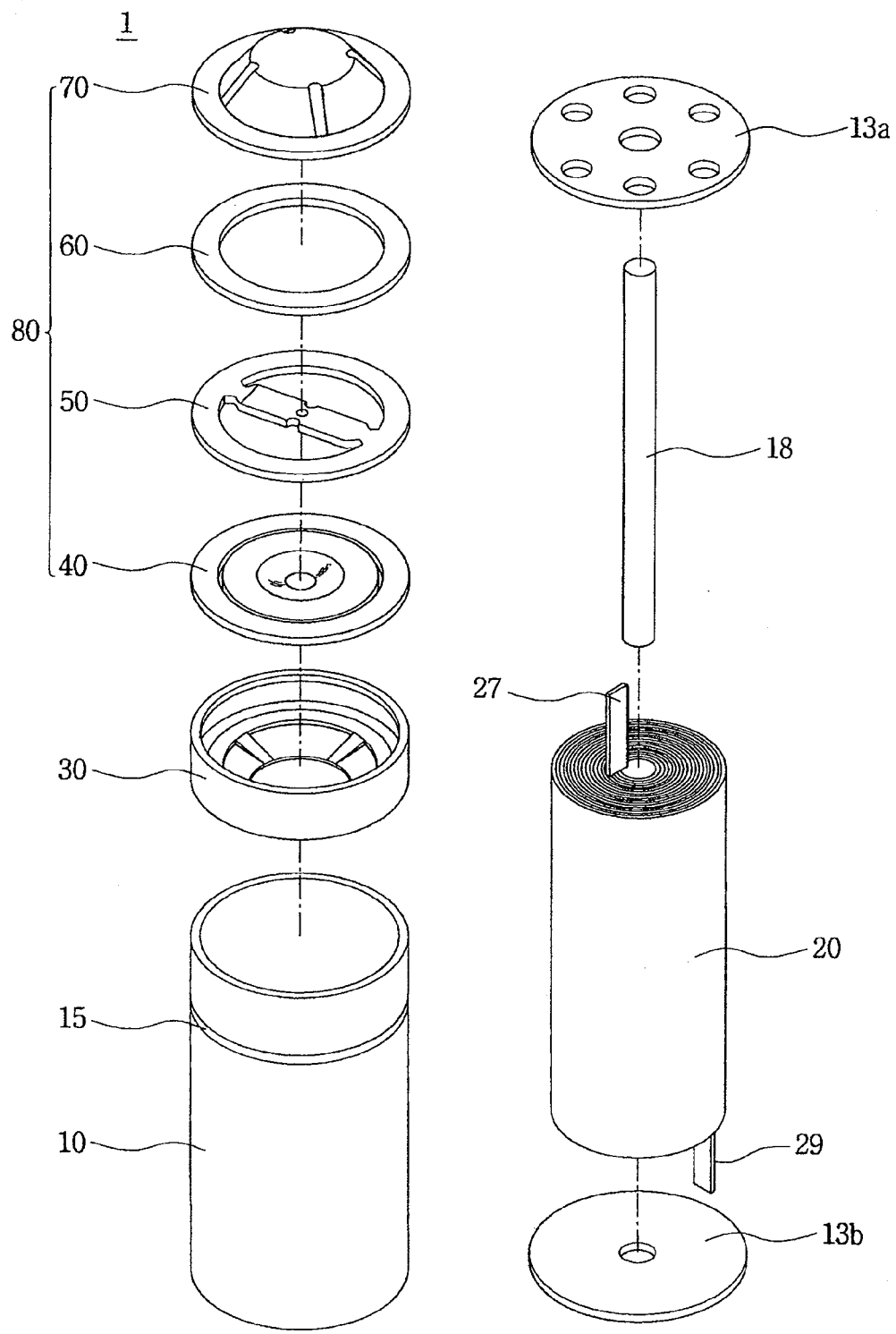
FIG. 1 is an exploded perspective view of a cylindrical secondary battery according to a first exemplary embodiment of the present invention.

The present invention will now be described in detail with reference to exemplary embodiments thereof shown in the accompanying drawings. In the drawings, the sizes and proportions of layers/regions may be exaggerated, and like reference numerals refer to like elements.

Figure 2:
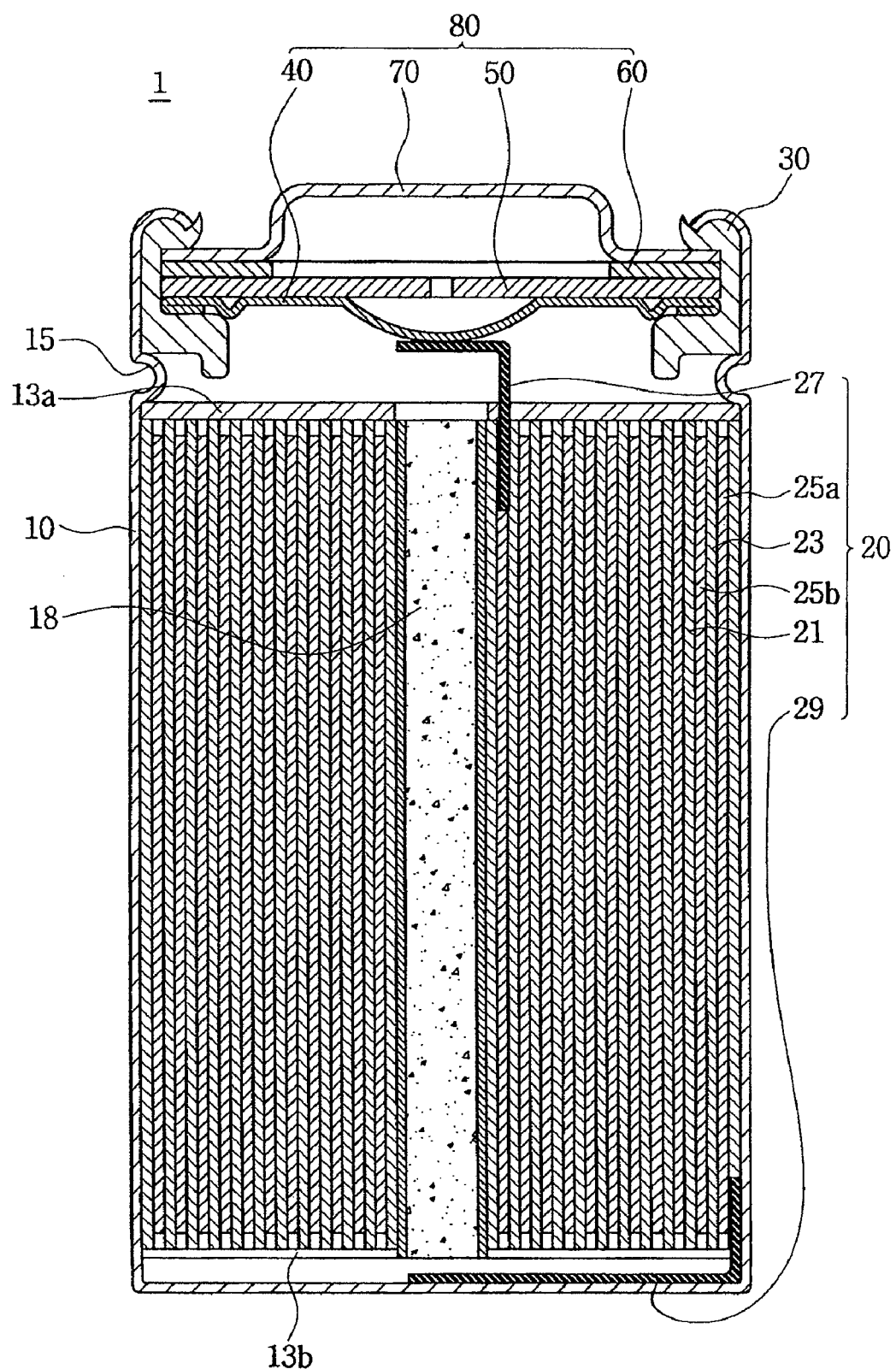
FIG. 2 is a cross-sectional view of the cylindrical secondary battery according to a first exemplary embodiment of the present invention.

FIG. 1 is an exploded perspective view of a cylindrical secondary battery according to a first exemplary embodiment of the present invention, and FIG. 2 is a cross-sectional view of the cylindrical secondary battery according to a first exemplary embodiment of the present invention.

Referring to FIGS. 1 and 2, two electrodes 21 and 23 formed in a rectangular planar shape are stacked and wound to form a jelly-roll-shaped electrode assembly 20. Here, separators 25a and 25b are disposed between the two electrodes, or respectively disposed below and over the electrodes. That is, a separator is disposed at a contact portion between the two electrodes, which are overlapped and wound, to prevent a short circuit.

Each electrode is formed by applying an active material slurry to an electrode collector formed of a metal foil or mesh of aluminum or copper. The slurry is generally formed by mixing a particle-phase active material, an auxiliary conductor, a binder and a plasticizing agent with a solvent. The solvent is removed in a subsequent electrode-forming process.

Non-coating portions having no slurry thereon are formed at a starting end and a terminating end of the electrode collector in the direction in which the electrode is wound. In the non-coating portion, each electrode tab is disposed at each electrode, and an electrode tab 27 (hereinafter, referred to as an "upward electrode tab") is formed to lead upward to an opening of a cylindrical can, and an electrode tab 29 (hereinafter, referred to as a "downward electrode tab") is formed to lead downward from the electrode.

The cylindrical can 10 is formed of steel or an aluminum alloy by dip drawing. Subsequently, the electrode assembly 20 is inserted into the can through the opening of the can. Here, prior to the insertion of the electrode assembly, a lower insulating plate 13b is covered on a bottom surface of the electrode assembly. The downward electrode tab 29 bypasses an outside of the lower insulating layer 13b, and is bent to be parallel to a bottom surface of the can. Both the lower insulating layer and the electrode assembly are inserted into the can.

Here, the electrode assembly 20 is formed in a cylindrical jelly-roll shape, and a center of the jelly-roll has a center hole. A center of the lower insulating plate also has a through hole in a region corresponding to the center hole of the electrode assembly. The bent portion of the downward electrode tab 29 crosses the through hole of the lower insulating plate.

A welding rod (not illustrated) comes down to the bottom surface of the can from the top through the center hole of the electrode assembly. The welding rod passes through a center through hole of the lower insulating plate, and contacts the electrode tab crossing the center through hole below the lower insulating plate. A top of the electrode tab contacts the welding rod, and a bottom of the electrode tab is welded in contact with the bottom surface of the can.

In one exemplary embodiment, a metal center pin 18 may be disposed in the center hole of the electrode assembly 20, which may then be inserted into the can 10. Here, a welding rod may be connected to a top of the center pin, through which a current flows.

After the downward electrode tab 29 is welded, an upper insulating plate 13a is disposed on the electrode assembly 20. Here, the upward electrode tab 27 of the electrode assembly is designed to lead upward through a through hole of the upper insulating plate. When the upper insulating layer has a center through hole, the downward electrode tab 29 may be welded after the upper insulating plate 13a is disposed. A beading operation is performed to form a bead 15 at an upper portion of the can by bending a side wall of the can inward to set an upper level of the electrode assembly. By the beading operation, vertical movement of the electrode assembly in the can of the completed cylindrical secondary battery due to external impact is prevented, and thus electrical connection reliability is increased.

Subsequently, an electrolyte is injected into the electrode assembly. The injection of the electrolyte may be performed before the beading operation. A gasket 30 is disposed on the can subjected to the beading operation, and the upward electrode tab 27 is welded to a vent 40, which is disposed at a lower portion of a cap assembly 80. Components of the cap assembly 80 may be assembled and then disposed in the gasket, or sequentially stacked in the gasket.

In the first exemplary embodiment, the cap assembly includes a positive temperature coefficient (PTC) thermistor 60, a cap-up 70 disposed on the PTC thermistor 60, and a current interrupt device (CID) 50 and the vent 40, which are disposed below the PTC thermistor 60.

While not illustrated in the drawing, the PTC thermistor 60 may not be included under the cap-up 70.

Next, a clamping operation is performed to close the can with the cap assembly 80, which acts as a cover and includes the cap-up disposed in the gasket 30, by applying pressure inward and downward to walls around an opening of the cylindrical can 10.

Figure 3A:
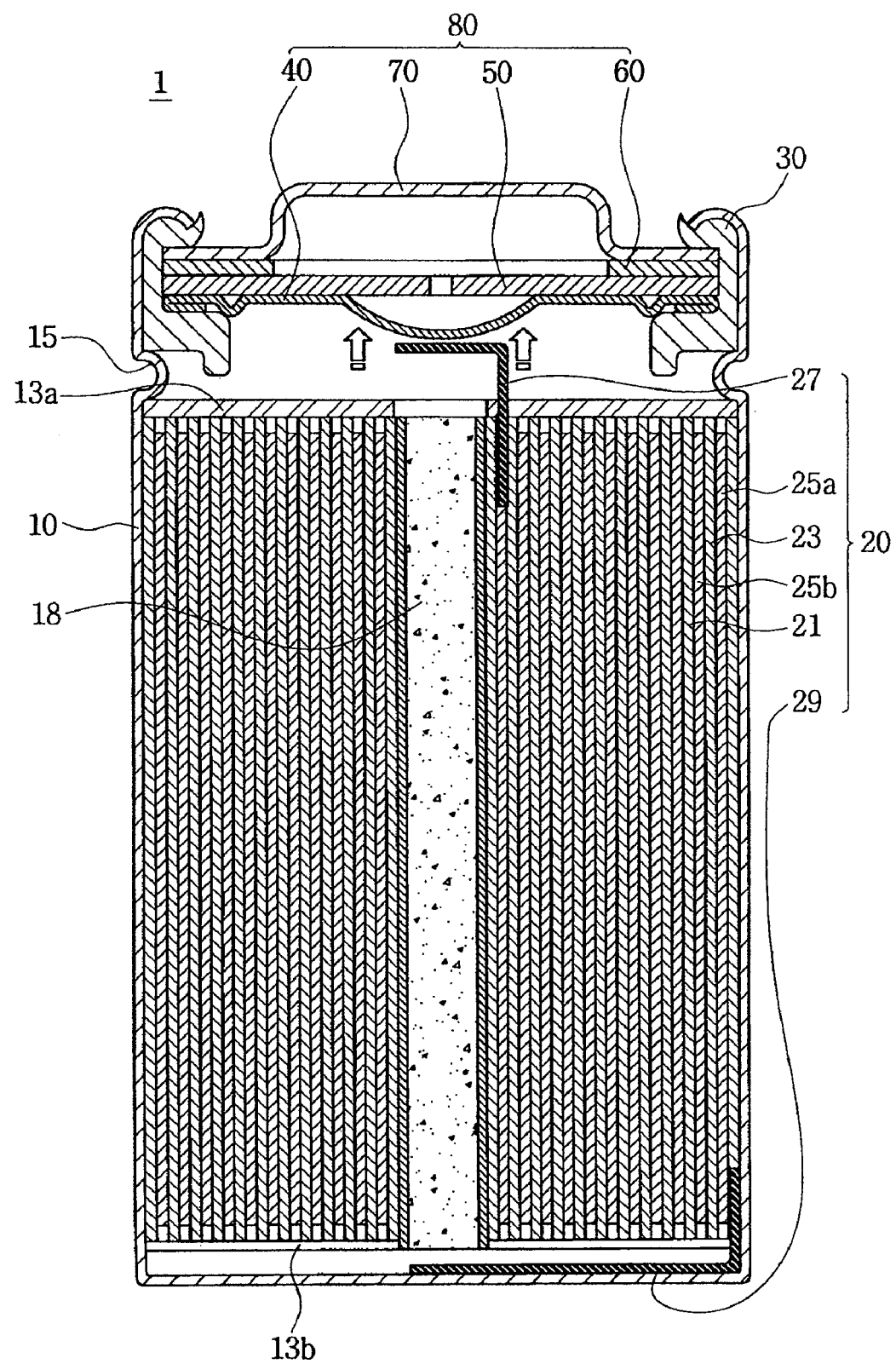
FIG. 3A is a cross-sectional view illustrating an operating pressure for interrupting current inside the cylindrical secondary battery according to a first exemplary embodiment of the present invention.
Figure 3B:
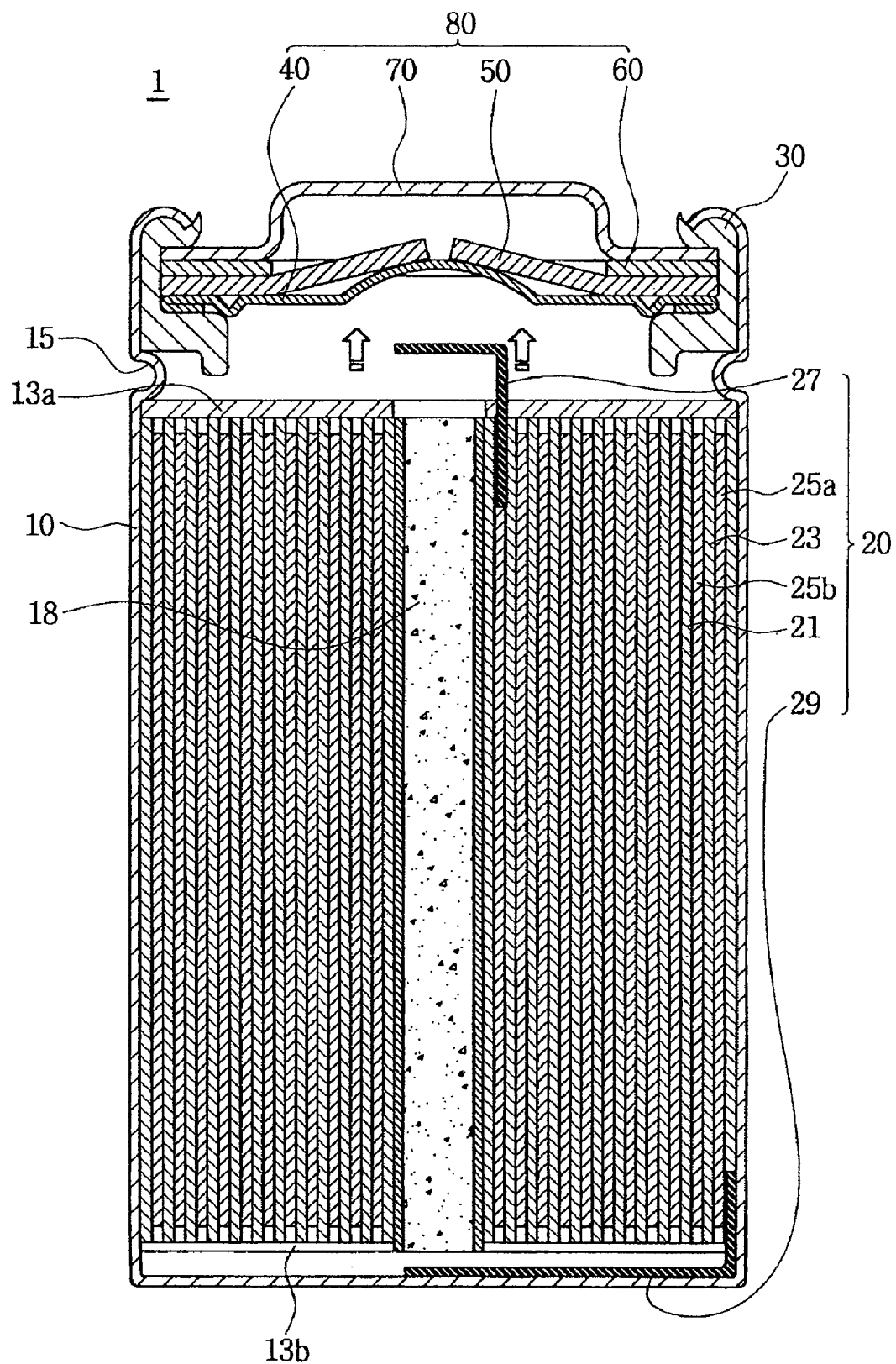
FIG. 3B is a cross-sectional view illustrating a breaking pressure of the cylindrical secondary battery according to a first exemplary embodiment of the present invention.

FIG. 3A is a cross-sectional view illustrating an operating pressure for interrupting current inside the cylindrical secondary battery according to a first exemplary embodiment of the present invention, and FIG. 3B is a cross-sectional view illustrating a breaking pressure of the cylindrical secondary battery according to a first exemplary embodiment of the present invention.

Referring to FIG. 3A, first, a certain amount of gas is generated in the battery due to various reasons, for example, overcharging of the battery, and thus pressure inside the battery is increased.

Here, the vent 40 is formed in a planar shape and has a projecting portion projecting downward in the middle. The projecting portion is welded and thus electrically connected to the upward electrode tab 27 of the electrode assembly. The projecting portion is inverted due to the increased pressure inside the battery.

Due to its inversion, the projecting portion is disconnected from the upward electrode tab 27 at the welded portion, thus interrupting current inside the battery.

The pressure inside the battery generated when the projecting portion of the vent is disconnected from the welded portion of the electrode tab to block the current inside the battery is referred to as an operating pressure for interrupting current.

Then, referring to FIG. 3B, the current inside the battery is blocked due to the disconnection between the projecting portion of the vent and the electrode tab at the welded portion, and thus charging of the battery is interrupted. However, the pressure inside the battery may increase due to gas still generated by internal factors, or due to external factors.

The increased internal pressure of the battery leads to inversion of the projecting portion of the vent and breakage of the CID.

That is, as the pressure inside the battery increases, the battery becomes liable to explode. To prevent explosion of the battery, when the pressure inside the battery reaches a predetermined level or more, the CID breaks to exhaust the gas and the internal pressure decreases.

In the present invention, the pressure inside the battery when the CID breaks due to inversion of the projecting portion of the vent is referred to as a breaking pressure.

Here, the operating pressure for interrupting current inside the secondary battery according to the first exemplary embodiment of the present invention is preferably in the range of 7 to 9 kgf/cm$^2$.

When the operating pressure for interrupting current is less than 7 kgf/cm$^2$, it is too low to exhibit a good 90-degree storage characteristic, and when the operating pressure for interrupting current is more than 9 kgf/cm$^2$, it is too high to exhibit a good adiabatic overcharge characteristic.

Figure 4:
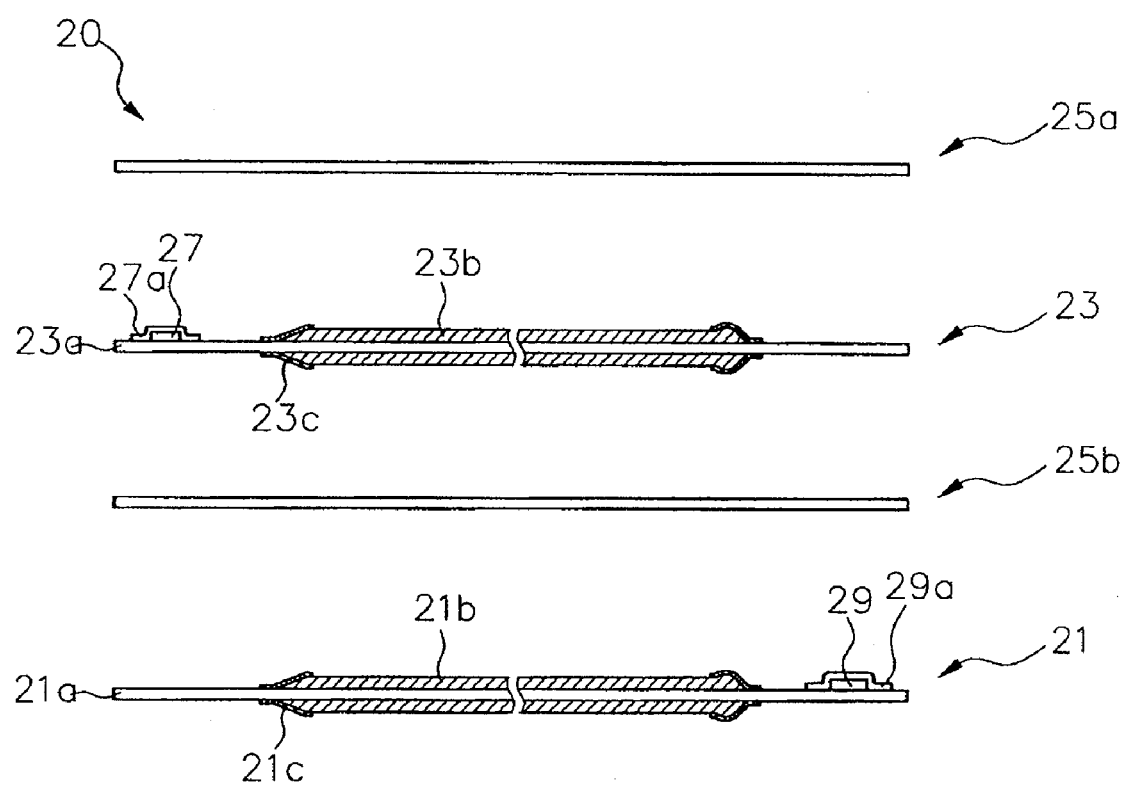
FIG. 4 is a cross-sectional view of an electrode assembly according to a first exemplary embodiment of the present invention.

FIG. 4 is a cross-sectional view of an electrode assembly according to a first exemplary embodiment of the present invention.

Referring to FIG. 4, the electrode assembly 20 includes a first electrode 21 (hereinafter, a positive electrode), a second electrode 23 (hereinafter, a negative electrode), and separators 25a and 25b.

The electrode assembly 20 is formed in a jelly-roll shape by stacking and winding the positive electrode 21, the negative electrode 23 and the separators 25a and 25b.

The separators include a first separator 25b disposed between the positive electrode 21 and the negative electrode 23, and a second separator 25a disposed under or over both electrodes 21 and 23. The separators are interposed between contact portions of the electrodes which are stacked and wound to prevent a short circuit between the electrodes.

First, the positive electrode 21 is composed of a positive electrode collector 21a collecting electrons generated by chemical reaction and delivering the electrons to an external circuit, and a positive electrode active material layer 21b formed by applying a positive electrode slurry including a positive electrode active material to one or both surfaces of the positive electrode collector 21a.

The positive electrode 21 may include an insulating member 21c formed to cover at least one end of the positive electrode active material layer 21b.

The insulating member 21c may be an insulating tape which is composed of an adhesive layer and an insulating film attached to one side of the adhesive layer. Thus, the shape and material of the insulating member 21c are not limited in the present invention.

For example, the adhesive layer may be formed of an ethylene-acrylic ester copolymer, a rubber-based adhesive or an ethylene acetic acid vinyl copolymer, and the insulating film may be formed of polypropylene, polyethylene terephthalate or polyethylene naphthalate.

The positive electrode slurry including the positive electrode active material is not applied to one or both ends of the positive electrode collector 21a, thereby forming a positive electrode non-coating portion exposing the positive electrode collector 21a. The positive electrode tab 29 delivering electrons collected in the positive electrode collector 21a to an external circuit and formed in a nickel or aluminum thin film type is joined to the positive electrode non-coating portion.

A protection member 29a may be formed over a portion to which the positive electrode tab 29 is joined.

The protection member 29a protects the joined portion and thus helps to prevent a short circuit, and is preferably formed of a heat-resistant material such as a polymer resin, e.g., polyester. However, the shape and material of the protection member 29a are not limited in the present invention.

The positive electrode collector 21a may be formed of stainless steel, nickel, aluminum, titanium, an alloy thereof, or stainless steel surface-treated with carbon, nickel, titanium or silver, and preferably aluminum or an aluminum alloy. However, the shape and thickness of the positive electrode collector 21a are not limited in the present invention.

The positive electrode collector 21a may be formed in a foil, film, sheet, punched, porous or foamy shape, and generally have a thickness of 1 to 50 μm, and preferably 1 to 30 μm. However, the shape and thickness thereof are not limited in the present invention.

The positive electrode active material layer according to the first exemplary embodiment of the present invention may include a material capable of intercalating and deintercalating lithium ions and lithium carbonate ($Li_2CO_3$).

The lithium carbonate ($Li_2CO_3$) increases pressure inside the battery by generating carbon dioxide during overcharging of the battery.

Here, the lithium carbonate ($Li_2CO_3$) content according to the first exemplary embodiment of the present invention is preferably in the range of 1.0 to 1.5 wt % of the total weight of the positive electrode active material layer.

When the content of the lithium carbonate ($Li_2CO_3$) is less than 1.0 wt %, there is insufficient gas, so that the adiabatic overcharge characteristic is poor, and when the content of the lithium carbonate ($Li_2CO_3$) is more than 1.5 wt %, the 90-degree storage characteristic is poor.

The positive electrode active material is capable of intercalating and deintercalating lithium ions. Examples of the positive electrode active material may include nickel-based positive electrode active materials, and preferably lithium-containing compounds, which are as follows:

$$Li_xNi_{1-y}M_yA_2 \tag{1}$$

$$Li_xNi_{1-y}M_yO_{2-z}X_z \tag{2}$$

$$Li_xNi_{1-y}CO_yO_{2-z}X_z \tag{3}$$

$$Li_xNi_{1-y-z}CO_yM_zA_\alpha \tag{4}$$

$$Li_xNi_{1-y-z}CO_yM_zO_{2-\alpha}X_\alpha \tag{5}$$

$$Li_xNi_{1-y-z}Mn_yM_zA_\alpha \tag{6}$$

$$Li_xNi_{1-y-z}Mn_yM_zO_{2-\alpha}X_\alpha \tag{7}$$

Here, $0.9 \leq x \leq 1.1$, $0 \leq 500.5$, $0 \leq z \leq 0.5$, $0 \leq \alpha \leq 2$, M is the same as or different from M' and selected from the group consisting of Mg, Al, Co, K, Na, Ca, Si, Ti, Sn, V, Ge, Ga, B, As, Zr, Mn, Cr, Fe, Sr, V and rare earth elements, A is selected from the group consisting of O, F, S and P, and X is selected from the group consisting of F, S and P.

That is, compared to lithium cobalt dioxide ($LiCoO_2$) used as a conventional positive electrode active material, nickel-based positive electrode active materials such as NCM and NCA are less expensive but cannot generate a sufficient amount of gas during overcharging of the battery. In the conventional battery, since the nickel-based positive electrode active material does not generate a sufficient amount of gas, the current interrupting means may not operate soon enough to ensure battery stability. Thus, the present invention can improve battery stability during overcharging of the battery by adding a predetermined content of $Li_2CO_3$ to the nickel-based positive electrode active material such as NCM or NCA, so that a sufficient amount of gas is generated during overcharging of the battery and thus the current interrupting means operates soon enough to ensure battery stability.

The positive electrode active material layer may further include a binder functioning as a buffer for pasting the active material, self-attachment of the active material, attachment to the collector, and expansion and contraction of the active material. The binder may be polyvinylidene fluoride, a polyhexafluoropropylene-polyvinylidene fluoride copolymer, poly(vinylacetate), polyvinylalcohol, polyethylene oxide, polyvinylpyrrolidone, alkylated polyethylene oxide, polyvinylether, poly(methylmethacrylate), poly(ethylacrylate), polytetrafluoroethylene, polyvinylchloride, polyacrylonitrile, polyvinyl pyridine, styrene-butadiene rubber or acrylonitrile-butadiene rubber.

The positive electrode active material layer may further include a conductive material improving electron conductivity, which may be at least one selected from the group consisting of graphite-, carbon black-, metal- and metal compound-based conductive materials.

Examples of the graphite-based conductive material may include artificial graphite and natural graphite, examples of the carbon black-based conductive material may include acetylene black, ketjen black, denka black, thermal black and channel black, and examples of the metal or metal compound-based conductive material may include tin, tin oxide, tin phosphate ($SnPO_4$), titanium oxide, potassium titanate, and perovskites such as $LaSrCoO_3$ and $LaSrMnO_3$.

The negative electrode 23 is composed of the negative electrode collector 23a collecting electrons generated by chemical reaction and delivering the electrons to an external circuit, and the negative electrode active material layer 23b formed by applying the negative electrode slurry including the negative electrode active material to one or both surfaces of the negative electrode collector 23a.

The negative electrode 23 may also include an insulating member 23c formed to cover at least one end of the negative electrode active material layer 23b.

The insulating member 23c may be an insulating tape composed of an adhesive layer and an insulating film attached to one side of the adhesive layer. However, the shape and material of the insulating member 23c are not limited in the present invention.

For example, the insulating layer may be formed of an ethylene-acrylic ester copolymer, a rubber-based adhesive or an ethylene acetic acid vinyl copolymer. The insulating film may be formed of polypropylene, polyethylene terephthalate or polyethylene naphthalate.

In addition, the negative electrode slurry including the negative electrode active material is not applied to one or both ends of the negative electrode collector 23a, thereby forming a negative electrode non-coating portion exposing the negative electrode collector 23a. A negative electrode tab 27 delivering the electrons collected in the negative electrode collector 23a to an external circuit and formed of a nickel thin film is joined to the negative electrode non-coating portion.

A protection member 27a may cover the negative electrode tab 27 to be joined.

The protection member 27a protects the joined portions to prevent a short circuit, and is preferably formed of a heat-resistant material such as a polymer resin, e.g., polyester. However, the shape and material of the protection member 27a are not limited in the present invention.

The negative electrode collector 23a may be formed of stainless steel, nickel, copper, titanium, an alloy thereof, or stainless steel surface-treated with carbon, nickel, titanium or silver, and preferably copper or a copper alloy. However, the material of the negative electrode collector 23a is not limited in the present invention.

The negative electrode collector 23a may be formed in a foil, film, sheet, punched, porous or foamy shape, and generally have a thickness of 1 to 50 μm, and preferably, 1 to 30 μm. However, the shape and thickness of the negative electrode collector 23a is not limited in the present invention.

The negative electrode active material layer 23b may be formed by mixing a conductive material such as carbon black and a binder for fixing an active material such as polyvinylidene fluoride (PVDF), styrene butadiene rubber (SBR) or polytelrafluoro ethylene (PTFE), with the negative electrode active material.

Examples of the negative electrode active material may include carbonaceous materials such as crystalline carbon, amorphous carbon, a carbon complex and a carbon fiber, a lithium metal and a lithium alloy, but the negative electrode active material is not limited in the present invention.

The separators 25a and 25b are generally formed of a thermoplastic resin such as polyethylene or polypropylene, but the material and structure of the separator is not limited in the present invention.

In addition, the cylindrical secondary battery according to the first exemplary embodiment of the present invention includes an electrolyte.

The electrolyte includes a non-aqueous organic solvent, examples of which include carbonates, esters, ethers and ketones. To be specific, examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC) and butylene carbonate (BC). Examples of esters include butyrolactone (BL), decanolide, valerolactone, mevalonolactone, caprolactone, n-methyl acetate, n-ethyl acetate and n-propyl acetate, examples of ethers include dibutyl ether, and examples of ketones include polymethyl vinyl ketone. However, the kind of the non-aqueous organic solvent is not limited in the present invention.

When the non-aqueous organic solvent is a carbonate-based organic solvent, it may be formed by mixing cyclic carbonate with chain carbonate. Here, the cyclic carbonate and the chain carbonate may be mixed in a volume ratio of 1:1 to 1:9, and more preferably in a volume ratio of 1:1.5 to 1:4. The electrolyte may exhibit preferable performance with this volume ratio.

The carbonate-based organic solvent may further include an aromatic carbohydrate-based organic solvent. The aromatic carbohydrate-based organic solvent may include an aromatic carbohydrate-based compound.

Examples of the aromatic carbohydrate-based organic solvent include benzene, fluorobenzene, chlorobenzene, nitrobenzene, toluene, fluorotoluene, trifluorotoluene and xylene. In the electrolyte including the aromatic carbohydrate-based organic solvent, a volume ratio of the carbohydrate-based solvent to the aromatic carbohydrate-based solvent may be in the range of 1:1 to 30:1. The electrolyte may exhibit preferable performance with this volume ratio.

The electrolyte also includes a lithium salt, which serves as a source of lithium ions in the battery and allows basic operation of the lithium battery. The lithium salt may be at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_6SO_2)_2$, $LiAlO_4$, $LiAlCl_4$, $LiN(C_xF_{2x+1}SO_2)(C_yF_{2y+1}SO_2)$ (x and y are natural numbers) and $LiSO_3CF_3$, or a combination thereof.

A concentration of the lithium salt may be in the range of 0.6 to 2.0M, and preferably 0.7 to 1.6M. When the concentration of the lithium salt is less than 0.6M, conductivity of the electrolyte is decreased, and thus the performance of the electrolyte is degraded, and when the concentration of the lithium salt is more than 2.0M, viscosity of the electrolyte is increased, and thus mobility of the lithium ions is decreased.

Here, the content of the electrolyte according to the first exemplary embodiment of the present invention may be in the range of 10.8 to 11.93 wt % of the total weight of a bare cell.

The bare cell is formed by inserting an electrode assembly into a cylindrical can and closing the can with a cap assembly including a cap-up as a cover by applying pressure inward and downward to a wall around an opening of the cylindrical can through a clamping operation. The bare cell is not subjected to an operation of attaching a protection circuit board or a tubing operation of applying an outer case to an outside of the battery.

When the content of the electrolyte is less than 10.8 wt %, a lifespan characteristic is poor, and when the content of the electrolyte is more than 11.93 wt %, an overcharge characteristic is poor.

Figure 5:
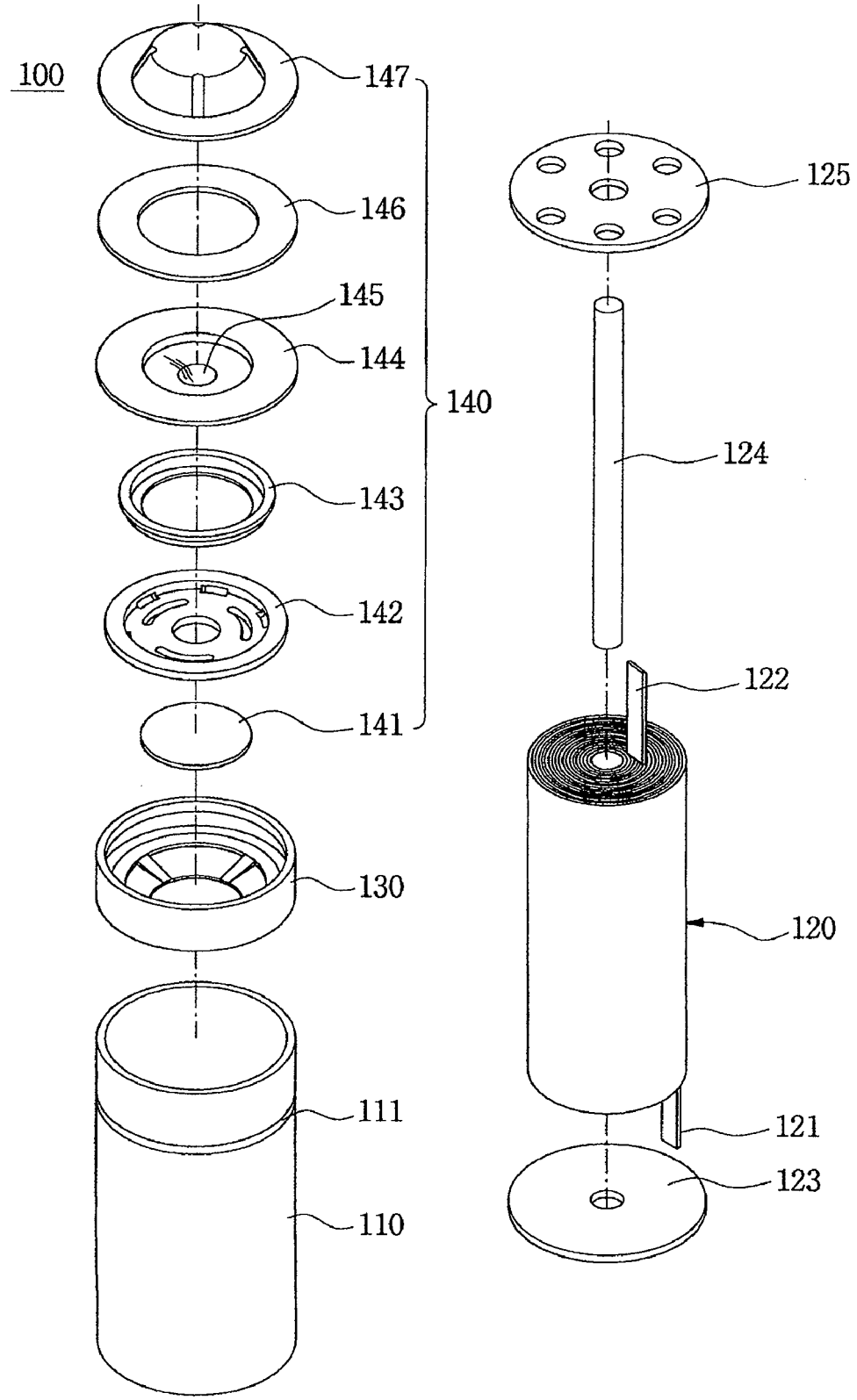
FIG. 5 is an exploded perspective view of a cylindrical secondary battery according to a second exemplary embodiment of the present invention.
Figure 6:
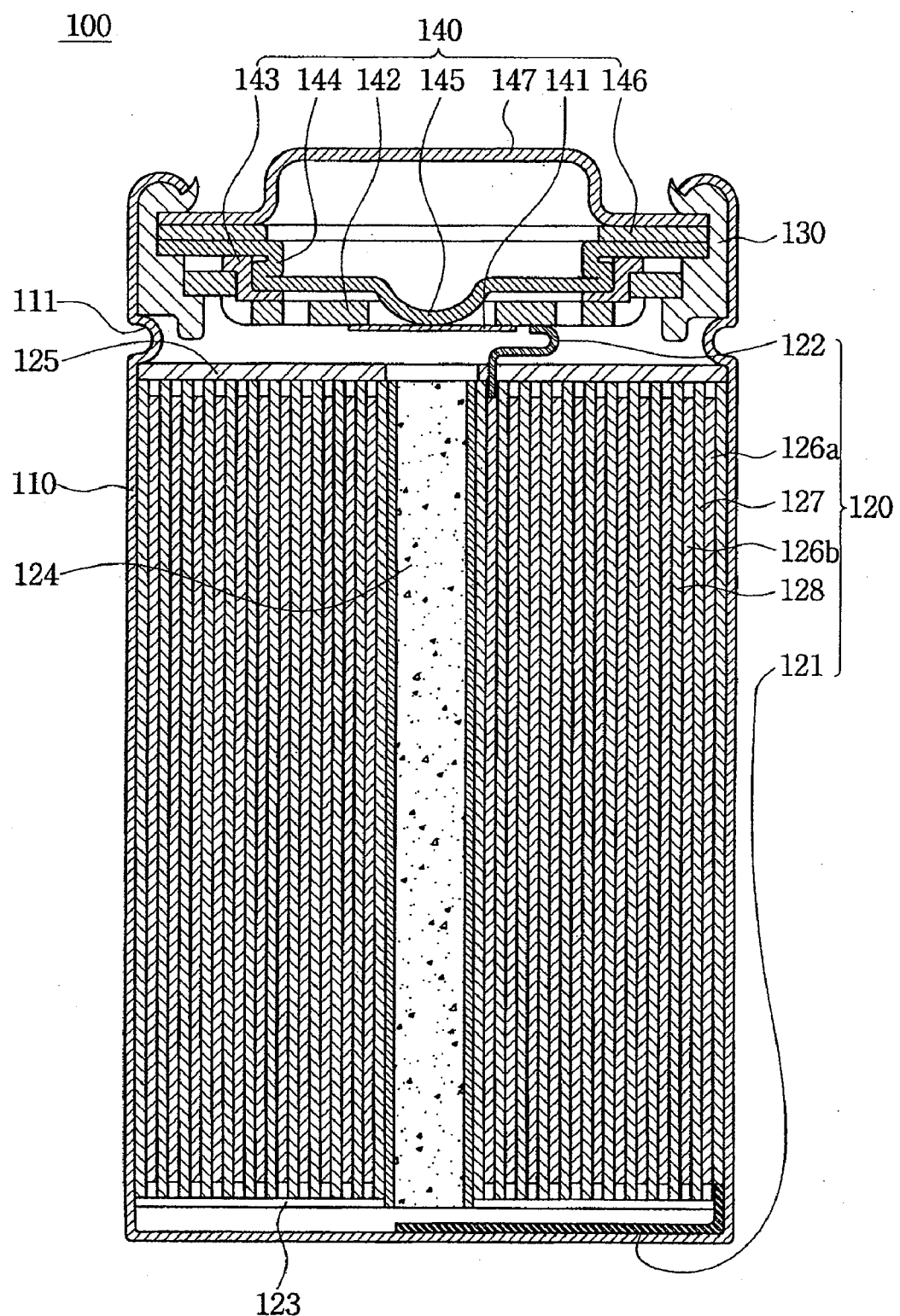
FIG. 6 is a cross-sectional view of the cylindrical secondary battery according to a second exemplary embodiment of the present invention.

FIG. 5 is an exploded perspective view of a cylindrical secondary battery according to a second exemplary embodiment of the present invention, and FIG. 6 is a cross-sectional view of the cylindrical secondary battery according to a second exemplary embodiment of the present invention.

The cylindrical secondary battery according to the present exemplary embodiment may be the same as described in the first exemplary embodiment except for following differences.

First, in the cylindrical secondary battery according to the second exemplary embodiment of the present invention, like in the first exemplary embodiment, two rectangular planar electrodes 127 and 128 are stacked and wound to form a jelly-roll type electrode assembly 120. Here, separators 126a and 126b are disposed between the electrodes, and under or on the electrodes, respectively. The separators are interposed between the two overlapped and wound electrodes at contact portions so as to prevent a short circuit.

In addition, one electrode tab 122 (hereinafter, referred to as an "upward electrode tab") is formed to lead upward to an opening of a cylindrical can, and the other electrode tab 121 (hereinafter, referred to as a "downward electrode tab") is formed to lead downward. The cylindrical can 110 is formed of steel or an aluminum alloy by dip drawing.

The electrode assembly 120 may be inserted into the can through the opening thereof, the can may include upper and lower insulating plates 125 and 123, and a center pin 124 may be disposed in a center hole of the electrode assembly 120.

A bead 111 may be formed by bending an upper side wall of the can inward to set a top level of the electrode assembly, and a gasket 130 may be inserted into the upper portion of the can which has been subjected to the beading operation. In addition, components of a cap assembly 140 may be assembled and disposed or sequentially stacked on the gasket.

Here, the cap assembly 140 according to the second exemplary embodiment of the present invention, as shown in FIGS. 5 and 6, has a different configuration from the conventional cap assembly having a CID, a PTC thermistor and a vent. In the cap assembly 140, a CID is omitted, a PTC thermistor 146 and a vent 144 are assembled together, a cap-down 142 having a center hole is disposed under the vent 144, and a sub-plate 141 is disposed under the cap-down 142. An insulating member 143 is interposed between the vent 144 and the cap-down 142 for insulation, and a projecting portion 145 of the vent 144 contacts the sub-plate 141, which is thus connected with the cap-down 142.

To be specific, the cap assembly according to the second exemplary embodiment of the present invention may sequentially include a cap-up 147, the PTC thermistor 146, the vent 144, the cap-down 142 and the sub-plate 141 from top to bottom. Here, electrical connections may be made between the cap-up 147 and the PTC thermistor 146 and between the PTC thermistor 146 and the vent 144, the vent and the cap-down may be spaced apart and insulated by interposing the insulating member 143 between them, and a downward-projecting portion 145 of the vent 144 may be exposed through a center through hole of the cap-down 142. In addition, the projecting portion contacts the sub-plate 141, which is thus connected with the cap-down 142. The upward electrode tab 122 of the electrode assembly may be connected to one surface of the cap-down 142.

Figure 7A:
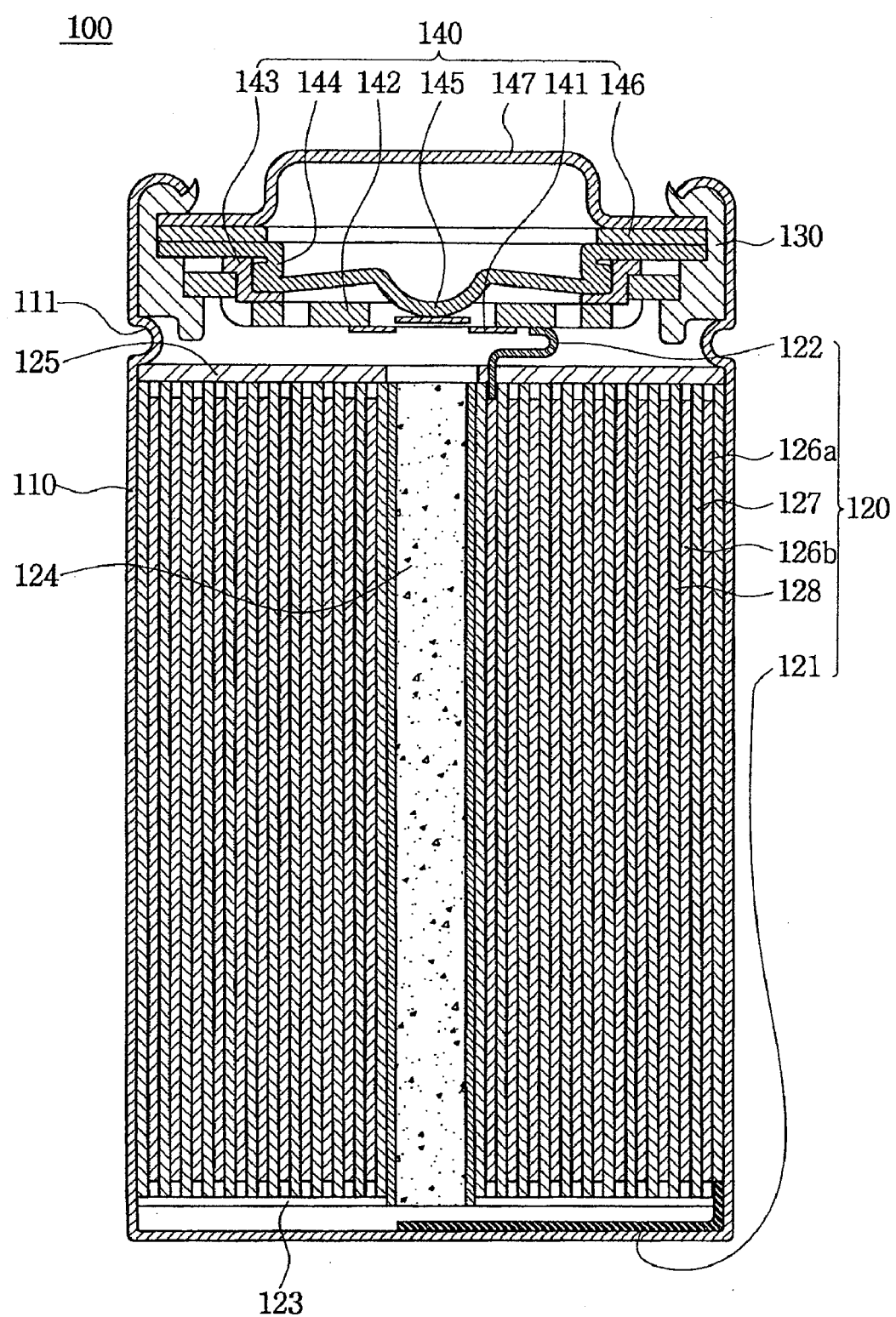
FIG. 7A is a cross-sectional view illustrating an operating pressure for interrupting current inside the cylindrical secondary battery according to a second exemplary embodiment of the present invention.
Figure 7B:
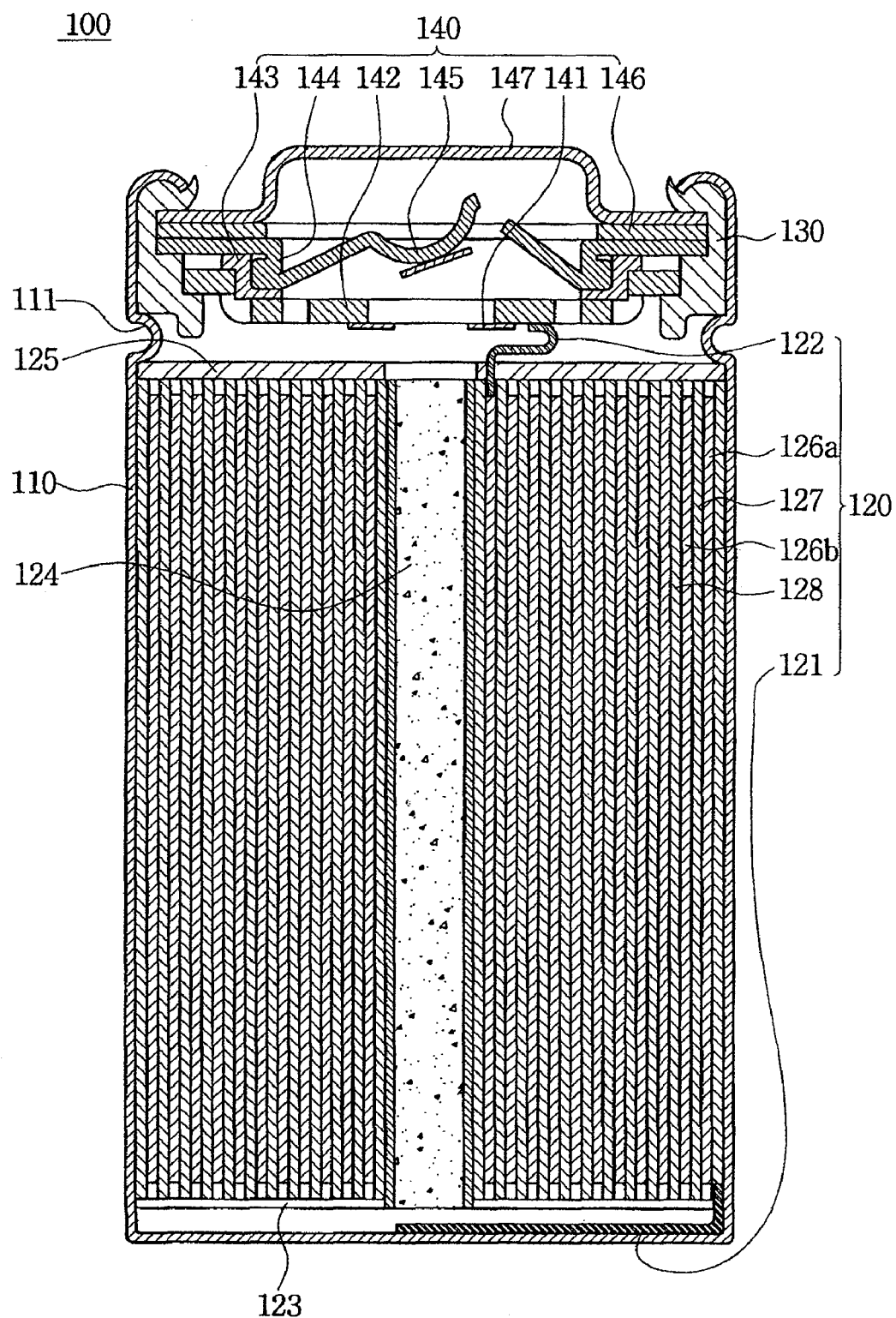
FIG. 7B is a cross-sectional view illustrating a breaking pressure of the cylindrical secondary battery according to a second exemplary embodiment of the present invention.

FIG. 7A is a cross-sectional view illustrating an operating pressure for interrupting current inside the cylindrical secondary battery according to the second exemplary embodiment of the present invention, and FIG. 7B is a cross-sectional view illustrating a breaking pressure of the cylindrical secondary battery according to the second exemplary embodiment of the present invention.

First, referring to FIG. 7A, a certain amount of gas is generated inside the battery due to various factors, e.g., overcharging of the battery, and thus pressure inside the battery is increased.

Here, the vent 144 is formed in a plate shape, and has the projecting portion 145 projecting downward in the middle. Here, the projecting portion 145 is electrically connected by being welded to a top surface of the sub-plate 141, and is inverted due to the increased internal pressure.

Due to such inversion, the projecting portion 145 is separated from the sub-plate 141 at the welded portion, or as illustrated in FIG. 7B, a certain region of the sub-plate is broken, resulting in interruption of current inside the battery.

In the present invention, the pressure inside the battery when the current is interrupted due to separation of the projecting portion from the sub-plate at the welded portion or breakage of a certain region of the sub-plate is referred to as an operating pressure for interrupting current.

Referring to FIG. 7B, when charging of the battery is stopped by interrupting the current inside the battery due to separation of the projecting portion from the sub-plate at the welded portion, or breakage of a certain region of the sub-plate, the pressure inside the battery increases due to gas continuously generated because of internal factors, or due to external factors.

Due to the increased pressure inside the battery, the vent 144 is broken.

That is, as the pressure inside the battery continues to increase, the battery is more liable to explode. To prevent explosion, when the internal pressure exceeds a predetermined level, the vent breaks to exhaust the gas and thus reduce the internal pressure.

In the present invention, the pressure inside the battery generated when the vent breaks is referred to as a breaking pressure.

Here, the operating pressure for interrupting current inside the secondary battery according to the second exemplary embodiment of the present invention may be in the range of 7 to 9 kgf/cm$^2$.

When the operating pressure for interrupting current is less than 7 kgf/cm$^2$, it is too low to exhibit good 90-degree storage characteristics, and when the operating pressure for interrupting current is more than 9 kgf/cm$^2$, it is too high to exhibit good adiabatic overcharge characteristics.

Hereinafter, the present invention will be described with reference to Examples and Comparative Examples. However, it should be understood that these examples are provided only to explain, not to limit, the present invention.

EXAMPLE 1

A positive electrode active material slurry was formed by mixing $LiNi_{1/2}CO_{1/5}Mn_{3/10}O_2$ as a positive electrode active material, polyvinylidene fluoride (PVDF) as a binder, and carbon as a conductive material, adding $Li_2CO_3$, and dispersing the mixture in N-methyl-2-pyrollidone. The slurry was coated on a 20 μm-thick aluminum foil, dried and wound to form a positive electrode. A negative electrode active material slurry was formed by mixing artificial graphite as a negative electrode active material, styrene-butadiene rubber as a binder, and carboxymethylcellulose as a thickening agent, and dispersing the mixture in water. This slurry was coated on a 15 μm-thick copper foil, dried and wound to form a negative electrode.

A separator, composed of a porous layer formed of a ceramic material and a binder and a polyolefin-based resin layer, was interposed between the formed electrodes, and the resulting structure was wound and pressed to be inserted into a cylindrical can.

An electrolyte was injected into the cylindrical can, and thus a lithium secondary battery was completed.

Here, the content of $Li_2CO_3$ was 1.5 wt % of the total weight of the positive electrode active material layer, and the electrolyte was injected to 10.8 wt % of the total weight of a bare cell. The operating pressure for interrupting current inside the secondary battery was 9 kgf/cm$^2$.

EXAMPLE 2

A lithium secondary battery was fabricated as described in Example 1, except that the operating pressure for interrupting current was 8 kgf/cm$^2$.

EXAMPLE 3

A lithium secondary battery was fabricated as described in Example 1, except that the operating pressure for interrupting current was 7 kgf/cm$^2$.

EXAMPLE 4

A lithium secondary battery was fabricated as described in Example 1, except that $Li_2CO_3$ was mixed to a content of 1.0 wt % of the total weight of the positive electrode active material layer, the electrolyte was injected to a content of 11.1 wt % of the total weight of the bare cell, and the operating pressure for interrupting current was 8 kgf/cm$^2$.

EXAMPLE 5

A lithium secondary battery was fabricated as described in Example 1, except that the electrolyte was injected to a content of 11.1 wt % of the total weight of the bare cell, and the operating pressure for interrupting current was 8 kgf/cm$^2$.

EXAMPLE 6

A lithium secondary battery was fabricated as described in Example 1, except that the electrolyte was injected to a content of 11.3 wt % of the total weight of the bare cell, and the operating pressure for interrupting current was 8 kgf/cm$^2$.

EXAMPLE 7

A lithium secondary battery was fabricated as described in Example 1, except that the electrolyte was injected to a content of 11.93 wt % of the total weight of the bare cell, and the operating pressure for interrupting current was 8 kgf/cm$^2$.

COMPARATIVE EXAMPLE 1

A lithium secondary battery was fabricated as described in Example 1, except that the operating pressure for interrupting current was 9.5 kgf/cm$^2$.

COMPARATIVE EXAMPLE 2

A lithium secondary battery was fabricated as described in Example 1, except that the operating pressure for interrupting current was 6 kgf/cm$^2$.

COMPARATIVE EXAMPLE 3

A lithium secondary battery was fabricated as described in Example 1, except that no $Li_2CO_3$ was mixed in, the electrolyte was injected to a content of 11.1 wt % of the total weight of the bare cell, and the operating pressure for interrupting current was 8 kgf/cm².

COMPARATIVE EXAMPLE 4

A lithium secondary battery was fabricated as described in Example 1, except that $Li_2CO_3$ was mixed to a content of 0.5 wt % of the total weight of the positive electrode active material layer, the electrolyte was injected to a content of 11.1 wt % of the total weight of the bare cell, and the operating pressure for interrupting current was 8 kgf/cm².

COMPARATIVE EXAMPLE 5

A lithium secondary battery was fabricated as described in Example 1, except that $Li_2CO_3$ was mixed to a content of 0.8 wt % of the total weight of the positive electrode active material layer, the electrolyte was injected to a content of 11.1 wt % of the total weight of the bare cell, and the operating pressure for interrupting current was 8 kgf/cm².

COMPARATIVE EXAMPLE 6

A lithium secondary battery was fabricated as described in Example 1, except that the electrolyte was injected to a content of 10.4 wt % of the total weight of the bare cell, and the operating pressure for interrupting current was 8 kgf/cm2.

COMPARATIVE EXAMPLE 7

A lithium secondary battery was fabricated as described in Example 1, except that the electrolyte was injected to a content of 10.6 wt % of the total weight of the bare cell, and the operating pressure for interrupting current was 8 kgf/cm².

COMPARATIVE EXAMPLE 8

A lithium secondary battery was fabricated as described in Example 1, except that $Li_2CO_3$ was mixed to a content of 1.6 wt % of the total weight of the positive electrode active material layer, the electrolyte was injected to a content of 11.1 wt % of the total weight of the bare cell, and the operating pressure for interrupting current was 8 kgf/cm².

COMPARATIVE EXAMPLE 9

A lithium secondary battery was fabricated as described in Example 1, except that $Li_2CO_3$ was mixed to a content of 1.7 wt % of the total weight of the positive electrode active material layer, the electrolyte was injected to a content of 11.1 wt % of total weight of the bare cell, and the operating pressure for interrupting current was 8 kgf/cm².

COMPARATIVE EXAMPLE 10

A lithium secondary battery was fabricated as described in Example 1, except that the electrolyte was injected to a content of 12.17 wt % of the total weight of the bare cell, and the operating pressure for interrupting current was 8 kgf/cm2.

COMPARATIVE EXAMPLE 11

A lithium secondary battery was fabricated as described in Example 1, except that the electrolyte was injected to a content of 10.74 wt % of the total weight of the bare cell, and the operating pressure for interrupting current was 8 kgf/cm².

Adiabatic overcharge characteristics of the lithium batteries according to Examples 1 to 7 and Comparative Examples 1 to 11 were analyzed by fully charging the battery, allowing the battery to rest for 10 minutes to 72 hours, covering the battery with an adiabatic material to create adiabatic conditions, charging the battery to 18.5V for 1 hour at a charge and discharge rate of 2.0 C using a constant current (CC)/constant voltage (CV) method, and observing an exterior of the battery. Here, to satisfy the adiabatic overcharge characteristics, the battery should be maintained at a level of L0. Here, L0 denotes a state in which there is no change in the exterior of the battery, L1 denotes a state in which an electrolyte is leaked out, L2 denotes a state in which a surface temperature is less than 200° C. and smoke is generated, L3 denotes a state in which a surface temperature is 200° C. or more and smoke is generated, L4 denotes a state in which flames break out, and L5 denotes a state in which explosion occurs.

Further, lifespan characteristics of the lithium batteries according to Examples 1 to 7 and Comparative Examples 1 to 11 were analyzed at room temperature. To measure the lifespan characteristics of the battery at room temperature, the battery was charged to 4.2V at a charge rate of 0.8 C using a CC/CV method, allowed to rest for 10 minutes, discharged to 3.0V at a discharge rate of 1.0 C using a CC/CV method, and allowed to rest again for 10 minutes. Continuous charging and discharging of the battery were performed 300 cycles, and then a capacity retention rate (%) at the 300$^{th}$ cycle was calculated. When the capacity retention rate is 70% or more, it is represented as "OK," and when the capacity retention rate is less than 70%, it is represented as "NG."

Furthermore, 90-degree storage characteristics of the lithium batteries according to Examples 1 to 7 and Comparative Examples 1 to 11 were analyzed. The characteristics were analyzed by fully charging the battery, storing the battery in a 90-degree chamber, and checking voltage variation during storage of the battery to observe whether the current interrupting means operates or not. When the current interrupting means did not operate within 8 hours after the start of the test, it is represented as "OK," and when the current interrupting means operated within 8 hours after the start of the test, it is represented as "NG."

The measurement results are shown in Table 1.

TABLE 1

| | Conditions | | | | Results | | | | | |
| | | | | | Adiabatic Overcharge Test | | | Capacity retention Rate | | 90-Degree Storage Test | |
| | Content of Lithium Carbonate | Operating Pressure | Content of Electrolyte | Gas Amount | Time for Current Interruption | Maximum Temp (° C.) | Level | % | OK/ NG | Hr | OK/ NG |
|---|---|---|---|---|---|---|---|---|---|---|---|
| E-1 | 1.50 | 9 | 10.8 | 1 | 13.01 | 76.2 | 5L0 | 92.1 | OK | 39 | OK |
| E-2 | 1.50 | 8 | 10.8 | 1 | 12.41 | 66.4 | 5L0 | 91.3 | OK | 29 | OK |

TABLE 1-continued

| | Conditions | | | Results | | | | | |
| | | | | Adiabatic Overcharge Test | | | | Capacity retention Rate | | 90-Degree Storage Test | |
| | Content of Lithium Carbonate | Operating Pressure | Content of Electrolyte | Gas Amount | Time for Current Interruption | Maximum Temp (°C.) | Level | % | OK/NG | Hr | OK/NG |
|---|---|---|---|---|---|---|---|---|---|---|---|
| E-3 | 1.50 | 7 | 10.8 | 1 | 11.91 | 58.2 | 5L0 | 91.7 | OK | 15 | OK |
| E-4 | 1.00 | 8 | 11.1 | 1.2 | 12.84 | 77.0 | 5L0 | 92 | OK | 50 | OK |
| E-5 | 1.50 | 8 | 11.1 | 1.13 | 12.64 | 75.7 | 5L0 | 91.3 | OK | 29 | OK |
| E-6 | 1.50 | 8 | 11.3 | 1.03 | 12.5 | 49.8 | 5L0 | 93.9 | OK | 15 | OK |
| E-7 | 1.50 | 8 | 11.93 | 1.18 | 12.1 | 49 | 5L0 | 94 | OK | 12 | OK |
| CE-1 | 1.50 | 9.5 | 10.8 | 1 | 13.09 | 99.4 | 5L1 | 92.3 | OK | 49 | OK |
| CE-2 | 1.50 | 6 | 10.8 | 1 | 11.32 | 50 | 5L0 | 91.1 | OK | 6 | NG |
| CE-3 | 0.00 | 8 | 11.1 | 0.84 | 13.45 | 460.0 | 5L5 | 89.3 | OK | 400 | OK |
| CE-4 | 0.50 | 8 | 11.1 | 0.85 | 13.45 | 499.4 | 5L5 | 89.4 | OK | 270 | OK |
| CE-5 | 0.80 | 8 | 11.1 | 1.06 | 13.42 | 380.5 | 3L4, 2L5 | 89.5 | OK | 100 | OK |
| CE-6 | 1.50 | 8 | 10.4 | 0.93 | 12.97 | 87.6 | 5L1 | 67 | NG | 75 | OK |
| CE-7 | 1.50 | 8 | 10.6 | 0.95 | 12.90 | 90.5 | 5L1 | 68 | NG | 42 | OK |
| CE-8 | 1.60 | 8 | 11.10 | 1.1 | 12.31 | 70.1 | 5L0 | 91.8 | OK | 6 | NG |
| CE-9 | 1.70 | 8 | 11.10 | 1.23 | 11.98 | 69.8 | 5L0 | 91.9 | OK | 4 | NG |
| CE-10 | 1.50 | 8 | 12.17 | 1.25 | 11.99 | 48.1 | 5L0 | 94.1 | OK | 7 | NG |
| CE-11 | 1.50 | 8 | 10.74 | 0.96 | 12.9 | 98.1 | 2L0, 3L1 | 87.3 | OK | 30 | OK |

Referring to Table 1, in Examples 1 to 7, by controlling the content of lithium carbonate and the content of the electrolyte, an amount of gas generated during adiabatic overcharging of the battery increased, reducing the time before interruption of current. Due to the reduction of the time taking to interrupt current, the maximum surface temperature during the adiabatic overcharging of the battery decreased to 77° C. or less, and thus a level of the adiabatic overcharge characteristic was L0, which is very good. However, in Comparative Example 3 including no lithium carbonate, and Comparative Examples 4 and 5 including lithium carbonate at a content of less than 1.0 wt %, the adiabatic overcharge characteristics were very poor. Comparative Example 1, in which the operating pressure for interrupting current was more than 9 kgf/cm², also had a poor adiabatic overcharge characteristic.

Examples 1 to 7 had a capacity retention rate of about 91% or more due to control of the content of the electrolyte, which means that the batteries were quite reliable. However, Comparative Examples 6 and 7 including the electrolyte at a content of less than 10.8 wt % had a capacity retention rate of less than 70%, which means that the batteries had a problem in reliability. Here, Comparative Example 11, also including the electrolyte at a content of less than 10.8 wt %, had a good capacity retention rate but a poor adiabatic overcharge characteristic due to the small content of the electrolyte.

In Examples 1 to 7, the current interrupting means did not operate within 8 hours after storage of the battery in the 90-degree chamber, which means that the batteries satisfied the 90-degree storage characteristic. However, in Comparative Examples 8 and 9 including lithium carbonate at a content of more than 1.5 wt %, the batteries had a good adiabatic overcharge characteristic, but since the current interrupting means operated within 8 hours after storage of the battery in the 90-degree chamber, the batteries did not satisfy the 90-degree storage characteristic. In Comparative Example 10 including the electrolyte at a content of more than 11.93 wt %, the battery had a good adiabatic overcharge characteristic, but since the current interrupting means operated within 8 hours after storage of the battery in the 90-degree chamber, the battery did not satisfy the 90-degree storage characteristic. In Comparative Example 2 using the operating pressure for interrupting current of less than 7 kgf/cm², the battery had a good adiabatic overcharge characteristic, but since the current interrupting means operated within 8 hours after storage of the battery in the 90-degree chamber, the battery did not satisfy the 90-degree characteristic.

As a result, the content of lithium carbonate ($Li_2CO_3$) is preferably in the range of 1.0 to 1.5 wt % of the total weight of the positive electrode active material layer, the content of the electrolyte is preferably in the range of 10.8 to 11.93 wt % of the total weight of the bare cell, and the operating pressure of the secondary battery is preferably in the range of 7 to 9 kgf/cm².

By controlling the content of lithium carbonate, the content of the electrolyte and the operating pressure of the secondary battery, battery reliability can be improved without degrading performance, the 90-degree storage characteristic can be satisfied, and a good adiabatic overcharge characteristic can be obtained without reducing the capacity retention rate.

Consequently, the present invention can provide a cylindrical secondary battery ensuring the maximum level of battery safety without degrading battery performance.

Although a few exemplary embodiments of the present invention have been shown and described, it will be appreciated by those skilled in the art that various changes may be made to the described embodiments without departing from the principles and spirit of the invention, the scope of which is defined by the claims and their equivalents.

What is claimed is:
1. A secondary battery, comprising:
an electrode assembly including a positive electrode having a positive electrode active material layer containing lithium carbonate ($Li_2CO_3$), a negative electrode having a negative electrode active material layer, and a separator separating the positive electrode from the negative electrode;
a can housing the electrode assembly;
a cap assembly disposed on the can; and
an electrolyte injected into the can, wherein a content of the lithium carbonate (Li$_2$CO$_3$) is in the range of 1.0 to 1.5 wt % of the total weight of the positive electrode active material layer, a content of the electrolyte is in the range of 10.8 to 11.93 wt % of the total weight of a bare cell, and an operating pressure for interrupting current by the cap assembly is in the range of 7 to 9 kgf/cm$^2$.

2. The secondary battery according to claim 1, wherein the positive electrode active material layer further includes a nickel-based positive electrode active material.

3. The secondary battery according to claim 2, wherein the nickel-based positive electrode active material includes at least one selected from the group consisting of materials represented by Formulae (1) to (7):

$$Li_xNi_{1-y}M_yA_2 \quad (1)$$

$$Li_xNi_{1-y}M_yO_{2-z}X_z \quad (2)$$

$$Li_xNi_{1-y}Co_yO_{2-z}X_z \quad (3)$$

$$Li_xNi_{1-y-z}Co_yM_zA_\alpha \quad (4)$$

$$Li_xNi_{1-y-z}Co_yM_zO_{2-\alpha}X_\alpha \quad (5)$$

$$Li_xNi_{1-y-z}Mn_yM_zA_\alpha \quad (6) \text{ and}$$

$$Li_xNi_{1-y-z}Mn_yM_zO_{2-\alpha}X_\alpha \quad (7)$$

wherein $0.9 \leq x \leq 1.1$, $0 \leq y \leq 0.5$, $0 \leq z \leq 0.5$, $0 \leq \alpha \leq 2$, M is the same as or different from M' and selected from the group consisting of Mg, Al, Co, K, Na, Ca, Si, Ti, Sn, V, Ge, Ga, B, As, Zr, Mn, Cr, Fe, Sr, V and rare earth elements, A is selected from the group consisting of O, F, S and P, and X is selected from the group consisting of F, S and P.

4. The secondary battery according to claim 1, wherein the cap assembly includes a cap-up, a positive temperature coefficient (PTC) thermistor, a current interrupt device (CID) and a vent, sequentially disposed from top to bottom.

5. The secondary battery according to claim 4, wherein the operating pressure for interrupting current comprises a pressure inside the battery when current inside the battery is interrupted by disconnection between a projecting portion of the vent and an electrode tab at a welded portion.

6. The secondary battery according to claim 1, wherein the cap assembly includes a cap-up, a PTC thermistor, a vent, a cap-down and a sub-plate, sequentially disposed from top to bottom.

7. The secondary battery according to claim 6, wherein the operating pressure for interrupting current comprises a pressure inside the battery when current inside the battery is interrupted by disconnection between a projecting portion of the vent and the sub-plate at a welded portion or breakage of a certain region of the sub-plate.

8. The secondary battery according to claim 1, wherein the negative electrode active material includes one of crystalline carbon, amorphous carbon, a carbon complex, a carbon fiber, a lithium metal and a lithium alloy.

9. The secondary battery according to claim 1, wherein the electrolyte includes a non-aqueous organic solvent and a lithium salt.

10. The secondary battery according to claim 1, wherein the secondary battery is a cylindrical secondary battery.

11. A secondary battery, comprising:
an electrode assembly;
a can housing the electrode assembly;
a cap assembly disposed on the can;
and an electrolyte injected into the can,
wherein the electrode assembly includes lithium carbonate (Li$_2$CO$_3$) with a content ranging from 1.0 to 1.5 wt % of the total weight of a positive electrode active material layer, the electrolyte is injected with a content ranging from 10.8 to 11.93 wt % of the total weight of a bare cell, and an operating pressure for interrupting current by the cap assembly is in the range of 7 to 9 kgf/cm$^2$.

12. The secondary battery according to claim 11, wherein the electrode assembly includes a positive electrode having a positive electrode active material layer, a negative electrode having a negative electrode active material layer, and a separator separating the positive electrode from the negative electrode, the positive electrode active material layer further including a nickel-based positive electrode active material.

13. The secondary battery according to claim 12, wherein the nickel-based positive electrode active material includes at least one selected from the group consisting of materials represented by Formulae (1) to (7):

$$Li_xNi_{1-y}M_yA_2 \quad (1)$$

$$Li_xNi_{1-y}M_yO_{2-z}X_z \quad (2)$$

$$Li_xNi_{1-y}Co_yO_{2-z}X_z \quad (3)$$

$$Li_xNi_{1-y-z}Co_yM_zA_\alpha \quad (4)$$

$$Li_xNi_{1-y-z}Co_yM_zO_{2-\alpha}X_\alpha \quad (5)$$

$$Li_xNi_{1-y-z}Mn_yM_zA_\alpha \quad (6) \text{ and}$$

$$Li_xNi_{1-y-z}Mn_yM_zO_{2-\alpha}X_\alpha \quad (7)$$

wherein $0.9 \leq x \leq 1.1$, $0 \leq y \leq 0.5$, $0 \leq z \leq 0.5$, $0 \leq \alpha \leq 2$, M is the same as or different from M' and selected from the group consisting of Mg, Al, Co, K, Na, Ca, Si, Ti, Sn, V, Ge, Ga, B, As, Zr, Mn, Cr, Fe, Sr, V and rare earth elements, A is selected from the group consisting of O, F, S and P, and X is selected from the group consisting of F, S and P.

14. The secondary battery according to claim 11, wherein the cap assembly includes a cap-up, a PTC thermistor, a CID, and a vent, sequentially disposed from top to bottom.

15. The secondary battery according to claim 14, wherein the operating pressure for interrupting current comprises a pressure inside the battery when current inside the battery is interrupted by disconnection between a projecting portion of the vent and an electrode tab at a welded portion.

16. The secondary battery according to claim 11, wherein the cap assembly includes a cap-up, a PTC thermistor, a vent, a cap-down and a sub-plate, sequentially disposed from top to bottom.

17. The secondary battery according to claim 11, wherein the operating pressure for interrupting current comprises a pressure inside the battery when current inside the battery is interrupted by disconnection between a projecting portion of the vent and the sub-plate at a welded portion or breakage of a certain region of the sub-plate.

18. The secondary battery according to claim 12, wherein the negative electrode active material includes one of crystalline carbon, amorphous carbon, a carbon complex, a carbon fiber, a lithium metal and a lithium alloy.

19. The secondary battery according to claim 11, wherein the electrolyte includes a non-aqueous organic solvent and a lithium salt.

20. The secondary battery according to claim 11, wherein the secondary battery is a cylindrical secondary battery.

* * * * *

UNITED STATES PATENT AND TRADEMARK OFFICE
CERTIFICATE OF CORRECTION

PATENT NO. : 8,394,533 B2
APPLICATION NO. : 12/705338
DATED : March 12, 2013
INVENTOR(S) : Bak It is certified that error appears in the above-identified patent and that said Letters Patent is hereby corrected as shown below:

In the Specification

In column 2 at line 51, Change "$Li_xNi_{1-z}CO_yO_2X$" to -- $Li_xNi_{1-y}Co_yO_{2-z}X_z$ --.

In column 2 at line 53, Change "$Li_xNi_{1-y-z}CO_yM_zA_\alpha$" to -- $Li_xNi_{1-y-z}Co_yM_zA_\alpha$ --.

In column 2 at line 55, Change "$Li_xNi_{1-y-z}CO_yM_zO_{2-\alpha}X_\alpha$" to -- $Li_xNi_{1-y-z}Co_yM_zO_{2-\alpha}X_\alpha$ --.

In column 7 at line 24, Change "$Li_xNi_{1-z}CO_yO_2X$" to -- $Li_xNi_{1-y}Co_yO_{2-z}X_z$ --.

In column 7 at line 26, Change "$Li_xNi_{1-y-z}CO_yM_zA_\alpha$" to -- $Li_xNi_{1-y-z}Co_yM_zA_\alpha$ --.

In column 7 at line 28, Change "$Li_xNi_{1-y-z}CO_yM_zO_{2-\alpha}X_\alpha$" to -- $Li_xNi_{1-y-z}Co_yM_zO_{2-\alpha}X_\alpha$ --.

In column 7 at line 32, Change "(7)" to --(7).--.

In column 7 at line 33, Change "0500.5," to --0≤y≤0.5,--.

In column 9 at lines 49-50, Change "$LiN(C_2F_6SO_2)_2$," to -- $LiN(C_2F_5SO_2)_2$,--.

In column 11 at line 60, Change "$LiNi_{1/2}CO_{1/5}Mn_{3/10}O_2$" to -- $LiNi_{1/2}Co_{1/5}Mn_{3/10}O_2$ --.

Signed and Sealed this
Seventh Day of January, 2014

Margaret A. Focarino
*Commissioner for Patents of the United States Patent and Trademark Office*

CERTIFICATE OF CORRECTION (continued)
U.S. Pat. No. 8,394,533 B2

In column 13 at line 32, Change "kgf/cm2." to --kgf/cm$^2$.--.

In column 14 at line 8, Change "kgf/cm2." to --kgf/cm$^2$.--.

In the Claims

In column 17 at line 19, In Claim 3, change "$Li_xNi_{1-y}Co_yO_{2-z}X_z$" to --$Li_xNi_{1-y}Co_yO_{2-z}X_z$--.

In column 17 at line 21, In Claim 3, change "$Li_xNi_{1-y-z}Co_yM_zA_\alpha$," to --$Li_xNi_{1-y-z}Co_yM_zA_\alpha$--.

In column 17 at line 23, In Claim 3, change "$Li_xNi_{1-y-z}Co_yM_zO_{2-\alpha}X_\alpha$," to --$Li_xNi_{1-y-z}Co_yM_zO_{2-\alpha}X_\alpha$--.

In column 17 at line 26, In Claim 3, change "(7)" to --(7),--.

In column 18 at line 23, In Claim 13, change "$Li_xNi_{1-y}Co_yO_{2-z}X_z$" to --$Li_xNi_{1-y}Co_yO_{2-z}X_z$--.

In column 18 at line 25, In Claim 13, change "$Li_xNi_{1-y-z}Co_yM_zA_\alpha$," to --$Li_xNi_{1-y-z}Co_yM_zA_\alpha$--.

In column 18 at line 26, In Claim 13, change "$Li_xNi_{1-y-z}Co_yM_zO_{2-\alpha}X_\alpha$," to --$Li_xNi_{1-y-z}Co_yM_zO_{2-\alpha}X_\alpha$--.

In column 18 at line 30, In Claim 13, change "(7)" to --(7),--.